US009432422B2

United States Patent
Ding

(10) Patent No.: US 9,432,422 B2
(45) Date of Patent: Aug. 30, 2016

(54) METHOD AND APPARATUS FOR VOICE AND/OR VIDEO COMMUNICATION

(71) Applicant: ZTE CORPORATION, Shenzhen, Guangdong Province (CN)

(72) Inventor: Xuehua Ding, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/769,822

(22) PCT Filed: Aug. 26, 2013

(86) PCT No.: PCT/CN2013/082243
§ 371 (c)(1),
(2) Date: Aug. 24, 2015

(87) PCT Pub. No.: WO2014/131271
PCT Pub. Date: Sep. 4, 2014

(65) Prior Publication Data
US 2015/0381673 A1  Dec. 31, 2015

(30) Foreign Application Priority Data

Feb. 27, 2013  (CN) .......................... 2013 1 0061334

(51) Int. Cl.
*H04M 3/42* (2006.01)
*H04L 29/06* (2006.01)
*H04W 4/08* (2009.01)
*H04W 12/06* (2009.01)
*H04W 76/02* (2009.01)

(52) U.S. Cl.
CPC ......... *H04L 65/403* (2013.01); *H04L 65/1069* (2013.01); *H04N 7/15* (2013.01); *H04W 4/08* (2013.01); *H04W 8/005* (2013.01); *H04W 12/06* (2013.01); *H04W 76/023* (2013.01)

(58) Field of Classification Search
CPC .......... H04L 65/403; H04L 65/1069; H04W 12/06; H04W 8/005; H04N 7/15
See application file for complete search history.

(56) References Cited

FOREIGN PATENT DOCUMENTS

| CN | 1631013 A | 6/2005 |
|---|---|---|
| CN | 101621314 A | 1/2010 |
| CN | 102170679 A | 8/2011 |
| CN | 103200527 A | 7/2013 |
| WO | 0143351 A2 | 6/2001 |
| WO | WO2008110202 A1 | 9/2008 |

OTHER PUBLICATIONS

XP-002172432; Specification of the Bluetooth System; Wireless connections made easy; Dec. 1, 1999.

*Primary Examiner* — Martin Mushambo
(74) *Attorney, Agent, or Firm* — Ling Wu; Stephen Yang; Ling and Yang Intellectual Property

(57) ABSTRACT

A method and apparatus for voice and/or video communication are disclosed. The method includes: a primary terminal device searching for one or more secondary terminal devices; wherein wireless communication modules are set in both the primary terminal device and the secondary terminal device; the primary terminal device sending an authentication request to a searched secondary terminal device; after the primary terminal device receives an authentication response of the secondary terminal device, the primary terminal device establishing a connection with the secondary terminal device via respective wireless communication modules to form a communication group; and the primary terminal device and the secondary terminal device in the communication group performing end-to-end voice and/or video communication according to the respective wireless communication modules.

8 Claims, 4 Drawing Sheets

METHOD AND APPARATUS FOR VOICE AND/OR VIDEO COMMUNICATION

TECHNICAL FIELD

The present document relates to the field of mobile communication, and especially, to a method and apparatus for voice and/or video communication.

BACKGROUND OF THE RELATED ART

With the development of the science and technology, people perform communication with a mobile terminal more frequently, and generally a call mode of the mobile terminal provided in the related art is one-to-one call or three-party call, and it all needs support from network devices (such as base stations) of the mobile operators, and charging is performed according to a call duration in the call process. FIG. 1 is a schematic diagram of a traditional communication mode according to the related art, as shown in FIG. 1, a user 1 connects to a mobile operator network through a base station 1, and a user 2 and user 3 connect to the mobile operator network through a base station 2.

A three-party call is also called as a multi-party call or a conference call, and it is a service established on the basis of call waiting and hold. In an actual operation process of the three-party call, the effect of on-site conference can be simulated, and firstly an organizer is needed, and he is responsible for organizing participants to join, and he can control implementation of the conference. The application method of the three-party call is shown as follows: a user A serves as an initiator of the three-party call, and firstly the user A establishes a call with a user B through a mobile operator network, notifies and keeps the call with the user B; and then the user A dials a user C by means of making a normal call through the mobile operator network, and after communicating with the user C, a simultaneous call between the user A, user B and user C can be implemented by pressing a send key.

When the three-party call is used, when each time a call is made or a call is received, the charging is performed according to normal charge standard of the mobile phone. A user in a hold state occupies the voice channel, thus it is also required to calculate the call time. Based on the above description, it can be known that, the technical scheme provided in the related art has the following technical problems: 1. The mobile terminals can only make a one-to-one or three-party call; 2. It must depend on the support of the network devices, such as the base stations, of the mobile operators, and implementing the scheme is usually chargeable; 3. Two or more than two members of the three-party call cannot be combined into a group to make a call.

With respect to the problem of limited communication time and place due to that the mobile terminals must depend on the network of the mobile operator for communication in the related art, no effective solution has been proposed at present.

SUMMARY OF THE INVENTION

With respect to a problem of limited communication time and place due to that the mobile terminals must depend on the network of the mobile operator for communication in the related art, the present document provides a method and apparatus for voice and/or video communication, to solve the above technical problem.

According to one aspect of the embodiment of the present invention, the embodiment of the present invention provides a method for voice and/or video communication, which comprises:

a primary terminal device searching for one or more secondary terminal devices; wherein, wireless communication modules are set in both the primary terminal device and the secondary terminal device;

the primary terminal device sending an authentication request to a searched secondary terminal device;

after the primary terminal device receives an authentication response of the secondary terminal device, the primary terminal device establishing a connection with the secondary terminal device via the respective wireless communication modules to form a communication group; and the primary terminal device and the secondary terminal device in the communication group performing end-to-end voice and/or video communication according to the respective wireless communication modules.

Alternatively, the method further comprises:

the secondary terminal device in the communication group searching for other secondary terminal devices, and sending device identification information of other secondary terminal devices searched to the primary terminal device; wherein the other secondary terminal devices do not belong to the communication group;

after receiving the device identification information, the primary terminal device sending an authentication request to the other secondary terminal devices; and after receiving an authentication response of the other secondary terminal devices, the primary terminal device connecting the other secondary terminal devices to the communication group.

Alternatively, the method further comprises:

after receiving a group combination request sent by primary terminal devices in other communication groups, the primary terminal device in the communication group feeding back indication information to the primary terminal devices in the other communication groups; wherein the indication information is used for instructing the primary terminal devices in the other communication groups to dismiss the other communication groups;

after dismissing the other communication groups, the primary terminal devices in the other communication groups reporting device identification information of the primary terminal devices themselves to the primary terminal device in the communication group;

the primary terminal device in the communication group sending an authentication request to the primary terminal devices in the other communication groups; and after receiving an authentication response of the primary terminal devices in the other communication groups, the primary terminal device in the communication group taking the primary terminal devices in the other communication groups as secondary terminal devices of the communication group to connect to the communication group.

Alternatively, after the primary terminal devices in the other communication groups dismiss the other communication groups, the method further comprises:

the primary terminal devices in the other communication groups reporting device identification information of various secondary terminal devices in the other communication groups to the primary terminal device in the communication group;

the primary terminal device in the communication group sending an authentication request to the various secondary terminal devices; and after receiving an authentication response of the various secondary terminal devices, the primary terminal device in the communication group connecting the various secondary terminal devices to the communication group.

Alternatively, after the primary terminal device in the communication group connects the primary terminal devices in the other communication groups to the communication group, the method further comprises:

the primary terminal devices in the other communication groups sending device identification information of various secondary terminal devices in the other communication groups to the primary terminal device in the communication group;

the primary terminal device in the communication group sending an authentication request to the various secondary terminal devices; and after receiving an authentication response of the various secondary terminal devices, the primary terminal device in the communication group connecting the various secondary terminal devices to the communication group.

According to another aspect of the embodiment of the present invention, the embodiment of the present invention further provides an apparatus for voice and/or video communication, which comprises:

a search module, configured to: search for one or more secondary terminal devices; wherein wireless communication modules are set in both the apparatus and the secondary terminal device;

an authentication module, configured to: send an authentication request to a searched secondary terminal device;

a connection module, configured to: after receiving an authentication response of the secondary terminal device, establish a connection with the secondary terminal device via respective wireless communication modules to form a communication group; and a communication module, configured to: with the secondary terminal device in the communication group, perform end-to-end voice and/or video communication according to the respective wireless communication modules.

Alternatively, the apparatus further comprises:

a first information receiving module, configured to: receive device identification information sent by the secondary terminal device in the communication group; wherein the device identification information is device identification information of other secondary terminal devices searched by the secondary terminal device in the communication group; and the other secondary terminal devices do not belong to the communication group;

a first authentication request module, configured to: after receiving the device identification information, send an authentication request to the other secondary terminal devices; and a first device connection module, configured to: after receiving an authentication response of the other secondary terminal devices, connect the other secondary terminal devices to the communication group.

Alternatively, the apparatus further comprises:

an indication module, configured to: after receiving a group combination request sent by primary terminal devices in other communication groups, feed back indication information to the primary terminal devices in the other communication groups; wherein the indication information is used for instructing the primary terminal devices in the other communication groups to dismiss the other communication groups;

a second information receiving module, configured to: receive device identification information of the primary terminal devices themselves reported after the primary terminal devices in the other communication groups dismiss the other communication groups;

a second authentication request module, configured to: send an authentication request to the primary terminal devices in the other communication groups; and a second device connection module, configured to: after receiving an authentication response of the primary terminal devices in the other communication groups, take the primary terminal devices in the other communication groups as secondary terminal devices of the communication group to connect to the communication group.

Alternatively, the apparatus further comprises:

a third information receiving module, configured to: after the primary terminal devices in the other communication groups dismiss the other communication groups, receive device identification information of various secondary terminal devices in the other communication groups reported by the primary terminal devices in the other communication groups;

a third authentication request module, configured to: send an authentication request to the various secondary terminal devices; and a third device connection module, configured to: after receiving an authentication response of the various secondary terminal devices, connect the various secondary terminal devices to the communication group.

Alternatively, the device further comprises:

a fourth information receiving module, configured to: after connecting the primary terminal devices in the other communication groups to the communication group, receive device identification information of various secondary terminal devices in the other communication groups reported by the primary terminal devices in the other communication groups;

a fourth authentication request module, configured to: send an authentication request to the various secondary terminal devices; and a fourth device connection module, configured to: after receiving an authentication response of the various secondary terminal devices, connect the various secondary terminal devices to the communication group.

Through the embodiments of the present invention, after searching out the secondary terminal device, the primary terminal device initiates an authentication to the secondary terminal device, and after the authentication is passed, the primary terminal device establishes a connection with the secondary terminal device through respective wireless communication modules, thereby performing end-to-end voice and/or video bidirectional communication, which solves the problem of limited communication time and place due to that the mobile terminals must depend on the network of the mobile operator for communication in the related art. Since the support of the network devices or access points of the mobile operator is not required, the mobile terminals can implement an interconnection at any time and any place, which avoids the limitation of time and place in the communication process, saves communication costs, and improves the mobility and portability of the mobile terminal communication.

PREFERRED EMBODIMENTS OF THE INVENTION

In order to solve the problem of limited communication time and place due to that the mobile terminals must depend on the network of the mobile operator for communication in the related art, the embodiments of the present invention provide a method and apparatus for voice and/or video communication, and the embodiments of the present invention will be further described in detail in combination with the accompanying drawings and embodiments below. It should be understood that the specific embodiments described here are only used to explain the present document, which does not limit the present document.

Figure 1:
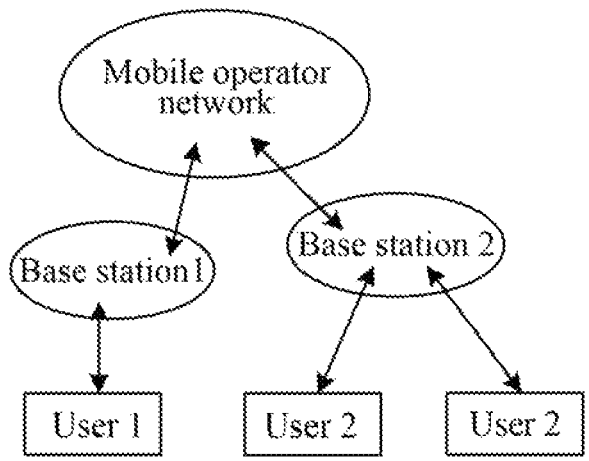
FIG. 1 is a schematic diagram of a traditional communication mode according to the related art.
Figure 2:
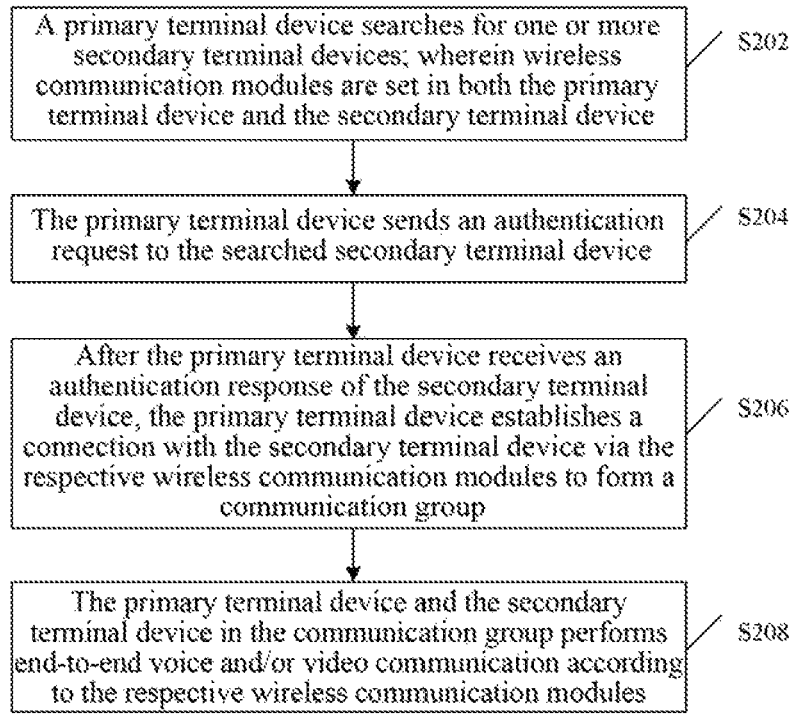
FIG. 2 is a flow chart of a method for voice and/or video communication according to the embodiment of the present invention.

The embodiment provides a method for voice and/or video communication, and the method can be implemented at a terminal device side, and FIG. 2 is a flow chart of the method for voice and/or video communication according to the embodiment of the present invention, and as shown in FIG. 2, the method includes the following steps (step S202 to step S208).

In step S202, a primary terminal device searches for one or more secondary terminal devices; wherein wireless communication modules are set in both the primary terminal device and the secondary terminal device.

In step 204, the primary terminal device sends an authentication request to the searched secondary terminal device.

In step 206, after the primary terminal device receives an authentication response of the secondary terminal device, the primary terminal device establishes a connection with the secondary terminal device via the respective wireless communication modules to form a communication group.

In step 208, the primary terminal device and the secondary terminal device in the communication group performs end-to-end voice and/or video communication according to the respective wireless communication modules.

Through the above method, after searching out the secondary terminal device, the primary terminal device initiates an authentication to the secondary terminal device, and after the authentication is passed, the primary terminal device establishes a connection with the secondary terminal device through respective wireless communication modules, thereby performing end-to-end voice and/or video bidirectional communication, which solves the problem of limited communication time and place due to that the mobile terminals must depend on the network of the mobile operator for communication in the related art. Since the support of the network devices or access points of the mobile operator is not required, the mobile terminals can implement an interconnection at any time and any place, which avoids the limitation of time and place in the communication process, saves communication costs, and improves the mobility and portability of the mobile terminal communication.

In the embodiment, when a wireless communication module of a mobile terminal is in a working state, it can initiatively search for other devices set configured with wireless communication modules, meanwhile, it also can be searched by the other devices set configured with the wireless communication modules. A communication group (in a one-to-one or one-to-many topological form) can be established through the above wireless communication modules. One communication group has one primary terminal device, the rest devices are all secondary terminal devices. The primary terminal device is responsible for controlling the whole communication group, which includes controlling which mobile terminal to join the communication group, when the communication group to start or stop, and combining the communication group with other communication groups.

Figure 3:
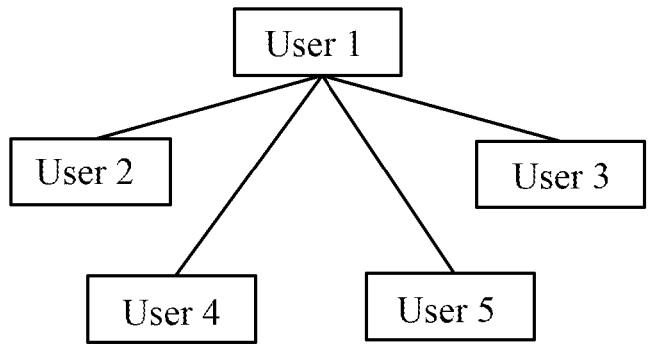
FIG. 3 is a schematic diagram of a communication mode of mobile terminals according to the embodiment of the present invention.

FIG. 3 is a schematic diagram of a communication mode of mobile terminals according to the embodiment of the present invention, and as shown in FIG. 3, the user 1, user 2, user 3, user 4 and user 5 form a communication group, wherein the user 1 is a primary terminal device of the communication group, the user 1 establishes a connection with each of the rest of the users, and the rest of the users are all secondary terminal devices of the communication group.

Figure 4:
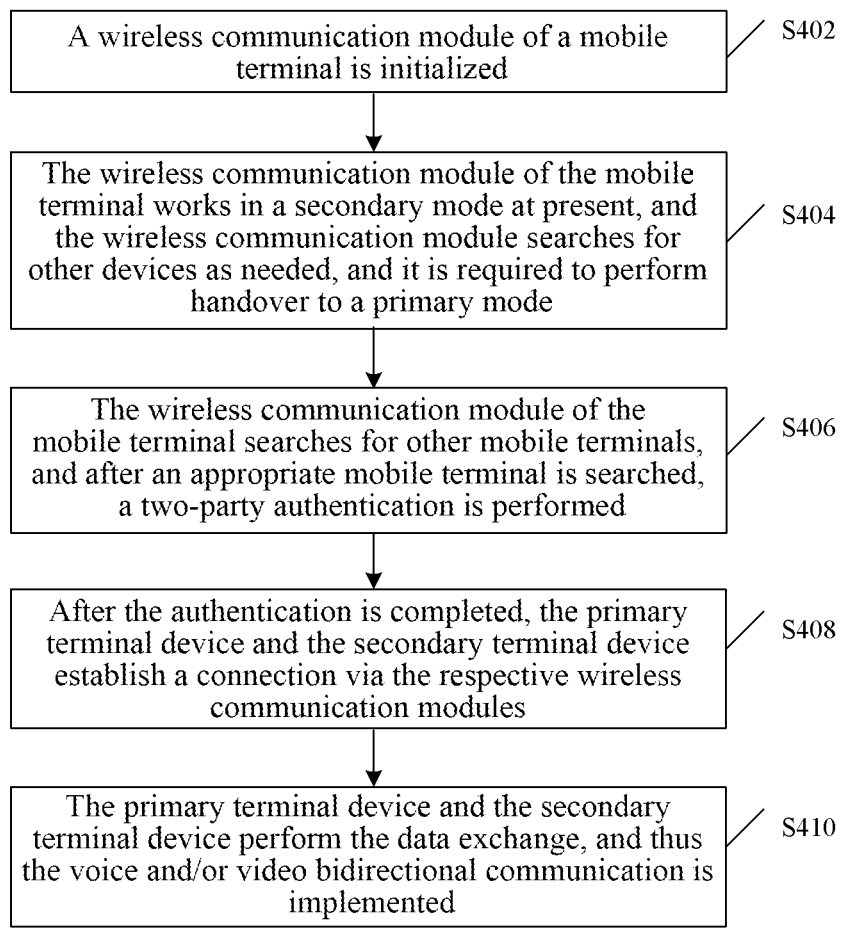
FIG. 4 is a flow chart of an implementation process of mobile terminal communication according to the embodiment of the present invention.

An implementation process of mobile terminal communication in the embodiment will be introduced below. FIG. 4 is a flow chart of the implementation process of the mobile terminal communication according to the embodiment of the present invention, and as shown in FIG. 4, the flow includes the following steps (step S402 to step S410).

In step S402, a wireless communication module of a mobile terminal is initialized.

In step S404, the wireless communication module of the mobile terminal works in a secondary mode at present, and the wireless communication module searches for other devices as needed, and it is required to perform handover to a primary mode.

In step S406, the wireless communication module of the mobile terminal searches for other mobile terminals, and after an appropriate mobile terminal is searched (one or more mobile terminals can be searched), a two-party (primary-secondary) authentication is performed, that is, the mobile terminal (a primary terminal device) sends an authentication request to the searched mobile terminal (a secondary terminal device), and if an authentication response of the searched mobile terminal is obtained, it is determined that the authentication is passed. If the wireless communication module does not find an appropriate mobile terminal, it will perform the circular searching all the time.

In step S408, after the authentication is completed, the primary terminal device and the secondary terminal device establish a connection via the respective wireless communication modules. The primary terminal device records and saves device identification information of the secondary terminal device.

In step S410, the primary terminal device and the secondary terminal device perform the data exchange, and thus voice and/or video bidirectional communication is implemented.

In a communication process of the mobile terminals, the primary terminal device can establish a one-to-many connection with the secondary terminal device in the meantime. In an actual operation process, the primary terminal device and the secondary terminal device can disconnect the connection between the two parties as needed. After the connection is disconnected, if the wireless communication module is not switched on, the mobile terminal will rework in the secondary mode and detect to search for a request.

In a specific communication process, a direct voice and/or video call can be made between members of the communication group. Each member in the communication group can control to select and display which members' video images. Moreover, besides that the primary terminal device can control the joining of other devices, the secondary terminal device also can initiate an invitation, and after the invitation is gathered to the primary terminal device, the primary terminal device controls whether to add other devices into the communication group.

With respect to the above process of the secondary terminal device inviting other devices, and the primary terminal device deciding whether to add other devices into the communication group in the end, the embodiment provides a preferred embodiment, that is, the secondary terminal device in the communication group searches for other secondary terminal devices, and sends device identification information of other secondary terminal devices searched to the primary terminal device; wherein the other secondary terminal devices do not belong to the communication group; after receiving the device identification information, the primary terminal device sends an authentication request to the other secondary terminal devices; and after receiving an authentication response of the other secondary terminal devices, the primary terminal device connects the other secondary terminal devices to the communication group. Through the above preferred embodiment, an implementation approach for the multi-party call is extended, and the application scope of the communication mode is enlarged.

With respect to the foregoing process of the secondary terminal device inviting other devices, and the primary terminal device deciding whether to add other devices into the communication group in the end, it will be described in detail through the specific embodiment below. The following scenario is assumed below, members in the communication group include a primary terminal device AA and a secondary terminal device BB, and members outside the communication group include a device CC, and the secondary terminal device BB invites the device CC to join the current communication group, and the implementation process thereof is described as follows: after searching out the device CC, the secondary terminal device BB transmits device identification information of the searched device CC to the primary terminal device AA, and after receiving the above device identification information, the primary terminal device AA sends an authentication request to the device CC according to the device identification information, and the device CC can accept or refuse the authentication request, and after the device CC receives the authentication request, the primary terminal device AA establishes a connection with the device CC to perform data transmission, and the device CC joins the communication group as a secondary terminal device of the communication group. In addition, the primary terminal device AA saves the device identification information of the device CC.

In an actual communication process, the network devices of the mobile operator are not required when the primary terminal device and the secondary terminal device establish a connection, and it is also not required to join a traditional home network, office network and hotspot network, and it is only required to utilize the respective wireless communication modules and the connection can be implemented. A mobile terminal with the wireless communication module can perform handover between two roles (a primary mode and a secondary mode), and it usually works in the secondary mode to wait for other mobile terminals to connect, and in case of need, it converts to the primary mode and initiates an authentication request to other mobile terminals.

When a mobile terminal works in the primary mode, the mobile terminal is called as a primary terminal device; and when a mobile terminal works in the secondary mode, the mobile terminal is called as a secondary terminal device. The primary terminal device firstly searches for an appropriate secondary terminal device, and after finding the appropriate secondary terminal device, it is required to initiate an authentication to the secondary terminal device, and the secondary terminal device responds to the authentication (accept or refuse), and if the secondary terminal device accepts the authentication, the primary terminal device records the device identification information of the secondary terminal device, then the primary terminal device and the secondary terminal device establish a link through respective wireless communication modules, and the primary terminal device and the secondary terminal device can perform bidirectional voice and/or video communication.

When a mobile terminal A works in a primary mode, it also may be searched out by other primary terminal devices B, and if the primary terminal device A is searched out by primary terminal devices B of other communication groups, it feeds back indication information to the primary terminal devices B and instructs the primary terminal devices B to convert a working mode to a secondary mode, and the conversion of the working mode can be implemented by dismissing communication groups to which the primary terminal devices B belong. After the working mode of the primary terminal devices B of the other communication groups are converted to the secondary mode, it can wait an authentication request of the above primary terminal device A. Thus, a connection and bidirectional communication between the primary terminal device A and the primary terminal devices B (they have been in the secondary mode here) are implemented.

Based on the above implementation process, the embodiment provides a preferred embodiment, that is, after receiving a group combination request sent by primary terminal devices in other communication groups, the primary terminal device in the communication group feeds back indication information to the primary terminal devices in the other communication groups; wherein the indication information is used for instructing the primary terminal devices in the other communication groups to dismiss the other communication groups; after dismissing the other communication groups, the primary terminal devices in the other communication groups report the device identification information of the primary terminal devices themselves to the primary terminal device in the communication group; the primary terminal device in the communication group sends an authentication request to the primary terminal devices in the other communication groups; and after receiving an authentication response of the primary terminal devices in the other communication groups, the primary terminal device in the communication group takes the primary terminal devices in the other communication groups as secondary terminal devices of the communication group to connect to the communication group.

With respect to the forgoing process of group combination, it will be described in detail through the specific embodiment below. The following scenario is assumed below, two or more than two communication groups are required to combine calls, for example, a communication group 1 has a primary terminal device A, a secondary terminal device B and a secondary terminal device C, and a communication group 2 has a primary terminal device D and a secondary terminal device E. It is assumed that the communication group 1 needs to be combined with the communication group 2, and descriptions will be made with an example of the communication group 1 joining the communication group 2 below. An implementation process is described as follows: the primary terminal device A of the communication group 1 searches for a device, and after searching out the primary terminal device D of the communication group 2, it sends a group combination request to the primary terminal device D. Afterwards, the primary terminal device D sends indication information to the primary terminal device A, to instruct the primary terminal device A to convert a working mode to a secondary mode, and with respect to this, the primary terminal device A can convert the working mode of the primary terminal device A itself to the secondary mode by means of dismissing the communication group 1. Then, the device A reports the device identification information of the device A itself to the primary terminal device D, and the primary terminal device D performs authentication on the device A. After the authentication is completed, the primary terminal device D establishes a connection with the device A, and the member of original communication group 1, namely the primary terminal device A, joins the communication group 2 as a secondary terminal device.

After the primary terminal device A dismisses the communication group 1, the secondary terminal device B and secondary terminal device C of the communication group 1 also can choose whether to join the communication group 2, to complete the combination of the communication group 1 and the communication group 2. For how the secondary terminal devices of the dismissed communication group to join other communication groups, two preferred embodiments will be described below.

The first approach is: after dismissing the communication group 1, the primary terminal device A of the communication group 1 reporting the device identification information of the secondary terminal device B and secondary terminal device C to the primary terminal device D of the communication group 2, so that the primary terminal device D can decide whether to initiate an authentication request and subsequent connection to the secondary terminal device B and secondary terminal device C. Specifically, after the primary terminal devices in the other communication groups dismiss the other communication groups, the method also includes: the primary terminal devices in the other communication groups reporting the device identification information of various secondary terminal devices in the other communication groups to the primary terminal device in the communication group; the primary terminal device in the communication group sending an authentication request to various secondary terminal devices; and after receiving an authentication response of various secondary terminal devices, the primary terminal device in the communication group connecting various secondary terminal devices to the communication group.

The second approach is: after joining the communication group 2 as a secondary terminal device, the primary terminal device A of the communication group 1 reporting the device identification information of the secondary terminal device B and secondary terminal device C to the primary terminal device D of the communication group 2, so that the primary terminal device D can decide whether to initiate an authentication request and subsequent connection to the secondary terminal device B and secondary terminal device C. Specifically, after the primary terminal device in the communication group connects the primary terminal devices in the other communication groups to the communication group, the method also includes: the primary terminal devices in the other communication groups sending the device identification information of various secondary terminal devices in the other communication groups to the primary terminal device in the communication group; the primary terminal device in the communication group sending an authentication request to various secondary terminal devices; and after receiving an authentication response of various secondary terminal devices, the primary terminal device in the communication group connecting various secondary terminal devices to the communication group.

The difference between the first approach above and the second approach above is that, the moments of the primary terminal devices of the other communication groups reporting the device identification information of the secondary terminal devices belonging to the same group to the primary terminal device of the communication group to be joined are different, and in the actual operation process, to choose specifically which approach can be decided according to the practical situation, which will not be limited here.

Figure 5:
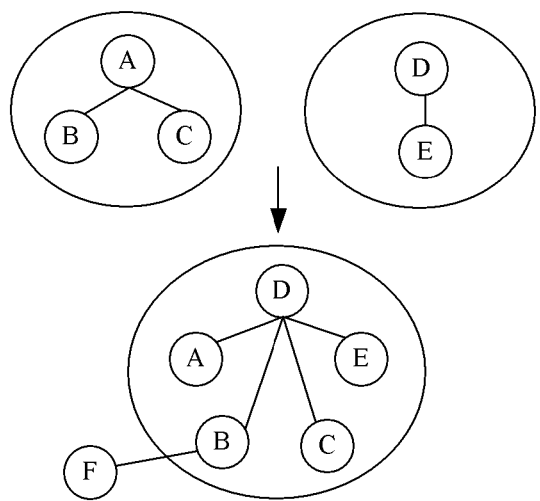
FIG. 5 is a schematic diagram of combining two groups according to the embodiment of the present invention.

The method for voice and/or video communication will be further described below. It is assumed that the technical scenario for implementing the embodiment is as follows: there are 6 users (A, B, C, D, E, F), in a schematic diagram of combining two groups as shown in FIG. 5, the users A, B and C belong to one communication group, and the user A is a primary terminal device, and the users B and C are secondary terminal devices; the users D and E belong to one communication group, and the user D is a primary terminal device, and the user E is a secondary terminal device.

The user A initiates a request to the users B and C, the user A as the primary terminal device and the users B and C as the secondary terminal devices establish a communication group 1. The user D initiates a request to the user E, the user D as the primary terminal device and the user E as the secondary terminal device establish a communication group 2. The communication group 1 is to join the communication group 2, and the process of group combination has been described above, which will not be repeated here. After the two groups are combined, the user D is a primary terminal device of the newly combined group, and the users A, B, C and E are secondary terminal devices. Afterwards, if the user B searches out the user F, the user B transmits the device identification information of the user F to the user D, and the user D sends an authentication request to the user F, and the user F joins the newly combined group after accepting the authentication request.

Figure 6:
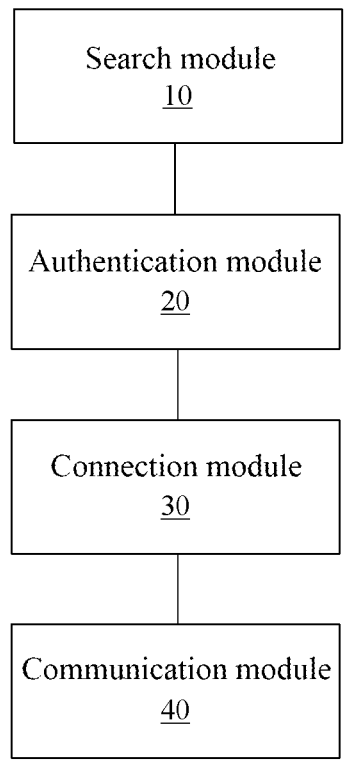
FIG. 6 is a structure diagram of an apparatus for voice and/or video communication according to the embodiment of the present invention.

Corresponding to the method for voice and/or video communication described in the above embodiment, the embodiment provides an apparatus for voice and/or video communication, and the apparatus can be set at a terminal device side, to implement the above embodiment. FIG. 6 is a structure diagram of the apparatus for voice and/or video communication according to the embodiment of the present invention, and as shown in FIG. 6, the apparatus includes: a search module 10, an authentication module 20, a connection module 30 and a communication module 40. The structure will be described in detail below.

The search module 10 is configured to: search for one or more secondary terminal devices; wherein wireless communication modules are set in both the apparatus and the secondary terminal device;

the authentication module 20, connected to the search module 10, is configured to: send an authentication request to the searched secondary terminal device;

the connection module 30, connected to the authentication module 20, is configured to: after receiving an authentication response of the secondary terminal device, establish a connection with the secondary terminal device via respective wireless communication modules to form a communication group; and the communication module 40, connected to the connection module 30, is configured to: with the secondary terminal device in the communication group, perform end-to-end voice and/or video communication according to the respective wireless communication modules.

Through the above apparatus, after the search module 10 of the primary terminal device searches out the secondary terminal device, the authentication module 20 initiates an authentication to the secondary terminal device, and after the authentication is passed, the connection module 30 of the primary terminal device establishes a connection with the secondary terminal device through respective wireless communication modules, thereby performing end-to-end voice and/or video bidirectional communication, which solves the problem of limited communication time and place due to that the mobile terminals must depend on the network of the mobile operator for communication in the related art. Since the support of the network devices or access points of the mobile operator is not required, the mobile terminals can implement an interconnection at any time and any place, which avoids the limitation of time and place in the communication process, saves communication costs, and improves the mobility and portability of the mobile terminal communication.

In the specific communication process, besides that the primary terminal device can control the joining of other devices, the secondary terminal device also can initiate an invitation, and after the invitation is gathered to the primary terminal device, the primary terminal device controls whether to add other devices into the communication group. Based on this, the embodiment provides a preferred structure, that is, the above apparatus also includes:

a first information receiving module, configured to: receive device identification information sent by the secondary terminal device in the communication group; wherein the device identification information is device identification information of other secondary terminal devices searched by the secondary terminal device in the communication group; and the other secondary terminal devices do not belong to the communication group;

a first authentication request module, configured to: after receiving the device identification information, send an authentication request to the other secondary terminal devices; and a first device connection module, configured to: after receiving an authentication response of the other secondary terminal devices, connect the other secondary terminal devices to the communication group.

Through the above preferred structure, an implementation approach for the multi-party call is extended, and the application scope of the communication mode is enlarged. In the actual communication process, the network devices of the mobile operator are not required when the primary terminal device and the secondary terminal device establish a connection, it is also not required to join a traditional home network, office network and hotspot network, and it is only required to utilize the respective wireless communication modules and the connection can be implemented.

When a mobile terminal works in the primary mode, the mobile terminal is called as a primary terminal device; and when a mobile terminal works in the secondary mode, the mobile terminal is called as a secondary terminal device. When a mobile terminal A works in the primary mode, it may also be searched by other primary terminal devices B, with respect to this, the embodiment provides a preferred structure, that is, the above apparatus also includes:

an indication module, configured to: after receiving a group combination request sent by primary terminal devices in other communication groups, feed back indication information to the primary terminal devices in the other communication groups; wherein the indication information is used for instructing the primary terminal devices in the other communication groups to dismiss the other communication groups;

a second information receiving module, configured to: receive device identification information of the primary terminal devices themselves reported after the primary terminal devices in the other communication groups dismiss the other communication groups;

a second authentication request module, configured to: send an authentication request to the primary terminal devices in the other communication groups; and a second device connection module, configured to: after receiving an authentication response of the primary terminal devices in the other communication groups, take the primary terminal devices in the other communication groups as secondary terminal devices of the communication group to connect to the communication group.

After the primary terminal devices of the other communication groups join the above communication group, for how the secondary terminal devices of the other communication groups to join the above communication group, two preferred structures will be described below.

The first preferred structure is that, the above apparatus also includes: a third information receiving module, configured to: after the primary terminal devices in the other communication groups dismiss the other communication groups, receive device identification information of various secondary terminal devices in the other communication groups reported by the primary terminal devices in the other communication groups; a third authentication request module, configured to: send an authentication request to the various secondary terminal devices; and a third device connection module, configured to: after receiving an authentication response of the various secondary terminal devices, connect the various secondary terminal devices to the communication group.

The second preferred structure is that, the above apparatus also includes: a fourth information receiving module, configured to: after connecting the primary terminal devices in the other communication groups to the communication group, receive device identification information of various secondary terminal devices in the other communication groups reported by the primary terminal devices in the other communication groups; a fourth authentication request module, configured to: send an authentication request to the various secondary terminal devices; and a fourth device connection module, configured to: after receiving an authentication response of the various secondary terminal devices, connect the various secondary terminal devices to the communication group.

The difference between the first preferred structure above and the second preferred structure above is that, the moments of the primary terminal devices of the other communication groups reporting the device identification information of the secondary terminal devices belonging to the same group to the primary terminal device of the communication group to be joined are different, and in the actual operation process, to choose specifically which approach can be decided according to the practical situation, which will not be limited here.

Figure 7:
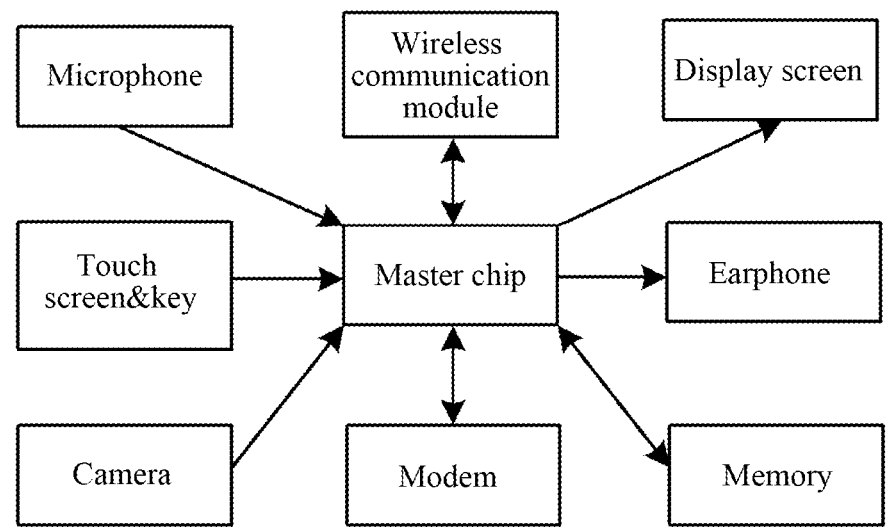
FIG. 7 is a schematic diagram of the hardware structure according to the embodiment of the present invention.

The method and apparatus for voice and/or video communication provided in the embodiments of the present invention have been described through the embodiments above, and in the actual operation process, the above method and apparatus can be implemented by setting some hardware in the terminal device. FIG. 7 is a schematic diagram of the hardware structure according to the embodiment of the present invention, and as shown in FIG. 7, the voice and/or video communication can be implemented by setting the following hardware in the terminal device: a master chip, a modem (computer hardware), a wireless communication module, a display screen, a earphone, a memory, a microphone, a touch screen & key and a camera.

The master chip is mainly responsible for data processing of the mobile terminal and interaction with all other hardware.

The modem is mainly responsible for a basic call function of the mobile terminal.

The wireless communication module is mainly responsible for implementing a connection of wireless calls, and the wireless communication module will perform interaction and data transmission through the existing wireless communication protocol that is widely used now, and after interacting with the master chip, the wireless communication module sends data to the master chip and receives data from the master chip.

The display screen is mainly responsible for displaying images, including and not limited to displaying interfaces of a call shared system.

The earphone is mainly responsible for performing digital-to-analogue conversion on the data acquired from the master chip and then broadcasting the data to the user.

The touch screen & key is mainly responsible for receiving an operation of the user, and transmitting data to the master chip as an input device.

The microphone is mainly responsible for collecting voice data of the user, and after going through analogue-to-digital conversion, transmitting the voice data to the master chip.

The camera is mainly responsible for collecting image data of the user to transmit to the master chip.

FIG. 7 is a schematic diagram of the hardware location according to the embodiment of the present invention, and FIG. 7 describes the mobile terminal device with the example of a mobile phone, as shown in FIG. 7, an earphone is located at the top of the reverse side of the mobile phone, a wireless communication module and a camera are located on both sides of the receiver, the underside is a touch screen & key, and the bottom of the reverse side of the mobile phone is a microphone. Through the hardware described in the embodiment, an interconnection can be implemented in the condition of not utilizing the network devices, such as the base station, of the mobile communication operator or not joining a traditional home network, office network or hotspot network. No telephone charges will be generated in the process of establishing a shared call, and it also won't be affected by the stability of the network devices in the meantime, so that the shared call is more stable.

As can be seen from the above description, in the embodiments of the present invention, with the wireless communication modules, end-to-end (one-to-one or one-to-many topological form) voice and/or video communication is implemented, thereby implementing the following points: 1. One-to-many call; 2. A call can be made without utilizing the network devices of the mobile operator; 3. Two or more than two groups can be combined into one group to perform inter-group call sharing. Since other network devices or access points are not required, the mobile terminals can implement an interconnection at any time and any place, which avoids the limitation of time and place in the communication process, saves communication costs, and improves the mobility and portability of the mobile terminal communication.

Though the preferred embodiments of the present invention have been disclosed for the purpose of illustration, the skilled in the art will realize that various improvements, additions and replacements are also possible, therefore, the scope of the embodiments of the present invention should not be limited to the above embodiments.

INDUSTRIAL APPLICABILITY

Through the embodiments of the present invention, after searching out the secondary terminal device, the primary terminal device initiates an authentication to the secondary terminal device, and after the authentication is passed, the primary terminal device establishes a connection with the secondary terminal device through respective wireless communication modules, thereby performing end-to-end voice and/or video bidirectional communication, which solves the problem of limited communication time and place due to that the mobile terminals must depend on the network of the mobile operator for communication in the related art. Since the support of the network devices or access points of the mobile operator is not required, the mobile terminals can implement an interconnection at any time and any place, which avoids the limitation of time and place in the communication process, saves communication costs, and improves the mobility and portability of the mobile terminal communication.

What is claimed is:

1. A method for voice and/or video communication, comprising:
    a primary terminal device searching for a plurality of secondary terminal devices; wherein wireless communication modules are set in both the primary terminal device and the secondary terminal device;
    the primary terminal device sending an authentication request to the searched secondary terminal device;
    after the primary terminal device receives an authentication response of the secondary terminal device, the primary terminal device establishing a connection with the secondary terminal device via respective wireless communication modules to form a communication group; and
    the primary terminal device and the secondary terminal device in the communication group performing end-to-end voice and/or video communication according to the respective wireless communication modules;
    wherein, the method further comprises:
    the secondary terminal device in the communication group searching for other secondary terminal devices, and sending device identification information of other secondary terminal devices searched to the primary terminal device; wherein the other secondary terminal devices do not belong to the communication group;
    after receiving the device identification information, the primary terminal device sending an authentication request to the other secondary terminal devices; and after receiving an authentication response of the other secondary terminal devices, the primary terminal device connecting the other secondary terminal devices to the communication group.

2. The method according to claim 1, further comprising:

after receiving a group combination request sent by primary terminal devices in other communication groups, the primary terminal device in the communication group feeding back indication information to the primary terminal devices in the other communication groups; wherein the indication information is used for instructing the primary terminal devices in the other communication groups to dismiss the other communication groups;

after dismissing the other communication groups, the primary terminal devices in the other communication groups reporting device identification information of the primary terminal devices own to the primary terminal device in the communication group;

the primary terminal device in the communication group sending an authentication request to the primary terminal devices in the other communication groups; and after receiving an authentication response of the primary terminal devices in the other communication groups, the primary terminal device in the communication group taking the primary terminal devices in the other communication groups as secondary terminal devices of the communication group to connect to the communication group.

3. The method according to claim 2, after the primary terminal devices in the other communication groups dismiss the other communication groups, further comprising:

the primary terminal devices in the other communication groups reporting device identification information of various secondary terminal devices in the other communication groups to the primary terminal device in the communication group;

the primary terminal device in the communication group sending an authentication request to the various secondary terminal devices; and after receiving an authentication response of the various secondary terminal devices, the primary terminal device in the communication group connecting the various secondary terminal devices to the communication group.

4. The method according to claim 2, after the primary terminal device in the communication group connects the primary terminal devices in the other communication groups to the communication group, further comprising:

the primary terminal devices in the other communication groups sending device identification information of various secondary terminal devices in the other communication groups to the primary terminal device in the communication group;

the primary terminal device in the communication group sending an authentication request to the various secondary terminal devices; and after receiving an authentication response of the various secondary terminal devices, the primary terminal device in the communication group connecting the various secondary terminal devices to the communication group.

5. An apparatus for voice and/or video communication, comprising a processor and a storage device, wherein the storage device stores processor-executable programs, and the programs comprise:

a search module, configured to: search for a plurality of secondary terminal devices; wherein wireless communication modules are set in both the apparatus and the secondary terminal device;

an authentication module, configured to: send an authentication request to the searched secondary terminal device;

a connection module, configured to: after receiving an authentication response of the secondary terminal device, establish a connection with the secondary terminal device via respective wireless communication modules to form a communication group; and a communication module, configured to: with the secondary terminal device in the communication group, perform end-to-end voice and/or video communication according to the respective wireless communication modules;

wherein, the programs further comprise:

a first information receiving module, configured to: receive device identification information sent by the secondary terminal device in the communication group; wherein the device identification information is device identification information of other secondary terminal devices searched by the secondary terminal device in the communication group; and the other secondary terminal devices do not belong to the communication group;

a first authentication request module, configured to: after receiving the device identification information, send an authentication request to the other secondary terminal devices; and a first device connection module, configured to: after receiving an authentication response of the other secondary terminal devices, connect the other secondary terminal devices to the communication group.

6. The apparatus according to claim 5, wherein the programs further comprises:

an indication module, configured to: after receiving a group combination request sent by primary terminal devices in other communication groups, feedback indication information to the primary terminal devices in the other communication groups; wherein the indication information is used for instructing the primary terminal devices in the other communication groups to dismiss the other communication groups;

a second information receiving module, configured to: receive device identification information of the primary terminal devices own reported after the primary terminal devices in the other communication groups dismiss the other communication groups;

a second authentication request module, configured to: send an authentication request to the primary terminal devices in the other communication groups; and a second device connection module, configured to: after receiving an authentication response of the primary terminal devices in the other communication groups, take the primary terminal devices in the other communication groups as secondary terminal devices of the communication group to connect to the communication group.

7. The apparatus according to claim 6, wherein the programs further comprises:

a third information receiving module, configured to: after the primary terminal devices in the other communication groups dismiss the other communication groups, receive device identification information of various secondary terminal devices in the other communication groups reported by the primary terminal devices in the other communication groups;
a third authentication request module, configured to: send an authentication request to the various secondary terminal devices; and
a third device connection module, configured to: after receiving an authentication response of the various secondary terminal devices, connect the various secondary terminal devices to the communication group.

8. The apparatus according to claim 6, wherein the programs further comprises:
a fourth information receiving module, configured to: after connecting the primary terminal devices in the other communication groups to the communication group, receive device identification information of various secondary terminal devices in the other communication groups reported by the primary terminal devices in the other communication groups;
a fourth authentication request module, configured to: send an authentication request to the various secondary terminal devices; and
a fourth device connection module, configured to: after receiving an authentication response of the various secondary terminal devices, connect the various secondary terminal devices to the communication group.

* * * * *